US011469967B1

(12) United States Patent
Deitrich et al.

(10) Patent No.: US 11,469,967 B1
(45) Date of Patent: Oct. 11, 2022

(54) DETECTING AND RESOLVING CONFLICTS IN A COLLABORATIVE NETWORK PLANNING SYSTEM

(71) Applicant: Ciena Corporation, Hanover, MD (US)

(72) Inventors: Christopher T. Deitrich, Bainbridge Island, WA (US); Joseph John Ivko, Jr., Woodstock, GA (US); Rahul Pande, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/464,772

(22) Filed: Sep. 2, 2021

(30) Foreign Application Priority Data

Jul. 21, 2021 (IN) .............................. 202111032760

(51) Int. Cl.
*H04L 41/14* (2022.01)
*H04L 41/082* (2022.01)
*H04L 41/22* (2022.01)
*H04L 41/12* (2022.01)

(52) U.S. Cl.
CPC ............ *H04L 41/14* (2013.01); *H04L 41/082* (2013.01); *H04L 41/12* (2013.01); *H04L 41/22* (2013.01)

(58) Field of Classification Search
CPC ....... H04L 41/082; H04L 41/12; H04L 41/14; H04L 41/22
See application file for complete search history.

(56) References Cited

U.S. PATENT DOCUMENTS

| 7,577,154 | B1* | 8/2009 | Yung .................. H04L 12/5691 379/114.03 |
| 7,787,770 | B2 | 8/2010 | Aubin et al. |
| 8,433,192 | B2 | 4/2013 | Frankel et al. |
| 8,683,028 | B2 | 3/2014 | Davison et al. |
| 9,049,135 | B2 | 6/2015 | Otung |
| 9,191,280 | B2 | 11/2015 | Swinkels et al. |
| 9,491,086 | B2 | 11/2016 | Trnkus et al. |
| 9,986,317 | B1 | 5/2018 | Al Sayeed et al. |
| 10,153,843 | B2 | 12/2018 | Brueckheimer et al. |
| 10,404,365 | B2 | 9/2019 | Frankel et al. |
| 10,623,126 | B2 | 4/2020 | Littlewood et al. |
| 2006/0218268 | A1* | 9/2006 | Beck ...................... H04L 67/28 709/224 |
| 2018/0316576 | A1* | 11/2018 | Kang .................. H04L 41/0893 |

* cited by examiner

*Primary Examiner* — Gil H. Lee

(74) *Attorney, Agent, or Firm* — Clements Bernard Baratta; Lawrence A. Baratta, Jr.; Christopher L. Bernard

(57) ABSTRACT

Systems and methods for enabling collaboration for planning changes to a communications network are provided. A method, according to one implementation, includes receiving a first branch of a provisional plan, where the first branch includes information regarding a change to at least one of a network element and services to be provided by the network element. The method also includes receiving a second branch of the provisional plan, where the second branch includes information regarding a change to at least one of the network element and the services to be provided by the network element. The method also includes determining if the first branch and the second branch are compatible with each other. In response to determining that merging the second branch with the first branch would create a conflict, the method further includes providing a resolution to the conflict.

20 Claims, 9 Drawing Sheets

DETECTING AND RESOLVING CONFLICTS IN A COLLABORATIVE NETWORK PLANNING SYSTEM

TECHNICAL FIELD

The present disclosure generally relates to networking systems and methods. More particularly, the present disclosure relates to collaborative network planning systems for planning changes to a network and relates to detecting and resolving conflicts that arise during collaborative planning.

BACKGROUND

Generally, planning software is used for making plans to change a system in certain ways, depending on the particular system for which plans are being made. Various planning software tools may include a "plan over plan" approach defined as the building of one proposed undeployed plan on top of another proposed undeployed plan. However, this approach has proven to be challenging and difficult. These complexities are not new in the area of software development, where multiple developers work in parallel on the same or related sections of code. In recent years, distributed software development has come to depend heavily on Version Control Systems (VCS) that solve the accompanying problems.

The application of VCS concepts to manage plans can be used to simplify the planning tools. VCS software may be configured for tracking changes in any set of files, usually used for coordinating work among programmers collaboratively developing source code during software development. The VCS software may be designed for speed, data integrity, and support for distributed, non-linear workflows (e.g., parallel branches running on different systems).

However, conventional planning software tools are unable to effectively plan for and anticipate the intricacies of communications networks (e.g., optical networks) in particular. Instead, conventional planning software may merely provide feedback with respect to "textual" changes in the code. Therefore, there is a need in the field of planning software to enable application in the environment of communications networks in a parallel fashion, such as a distributed or collaborative planning system with multiple planners working concurrently.

BRIEF SUMMARY

The present disclosure is directed to systems and methods for enabling collaboration in a network planning structure. According to one implementation, a system includes a processing device and a memory device configured to store a computer program having instructions. The instructions, when executed, enable the processing device to receive a first branch of a provisional plan, whereby the first branch includes information regarding a proposed change to at least one of a network element and one or more services to be provided by the network element. The instructions also enable the processing device to receive a second branch of the provisional plan, whereby the second branch includes information regarding a proposed change to at least one of the network element and the one or more services to be provided by the network element. The processing device is also configured to determine if the first branch and the second branch are compatible with each other. In response to determining that merging the second branch with the first branch would create a conflict, the instruction enable the processing device to provide a resolution to the conflict.

The step of determining if the first branch and the second branch are compatible with each other may include performing an equipment conflict analysis and a service conflict analysis. For example, the equipment conflict analysis may include analyzing a network card planned for use in a slot of a chassis of the network element to determine if a different network card is also planned for use in the same slot at the same time. The service conflict analysis, for example, may include analyzing one or more ports of one or more network cards to determine if different services are planned to be provisioned from the same one or more ports.

The instructions may further enable the processing device to allow collaboration between a first user and a second user, wherein the first branch may be received from a first device associated with the first user and the second branch may be received from a second device associated with the second user. The instructions may further enable the processing device to highlight textual conflicts between the first branch and the second branch in a Command Line Interface (CLI) in one or more of the first and second devices.

The step of providing a resolution to the conflict may include recommending one or more modifications to at least one of the first branch and second branch. Recommending the one or more modifications, for example, may include: a) suggesting that a conflicting network card be planned for a different slot available in the network element; b) suggesting that time constraints be added or edited to allow different network cards planned for the same slot in the network element to fill the same slot at different times; c) suggesting that a service planned on a conflicting port of a network card be moved to a different port available on the network card; and/or d) suggesting that time constraints be added or edited to allow a port planned for providing conflicting services to provide the services at different times. Furthermore, the first branch and the second branch may include proposed changes at multiple network layers, where providing the resolution may include inter-layer dependencies. The step of determining if the first branch and the second branch are compatible with each other may include using version control functionality.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
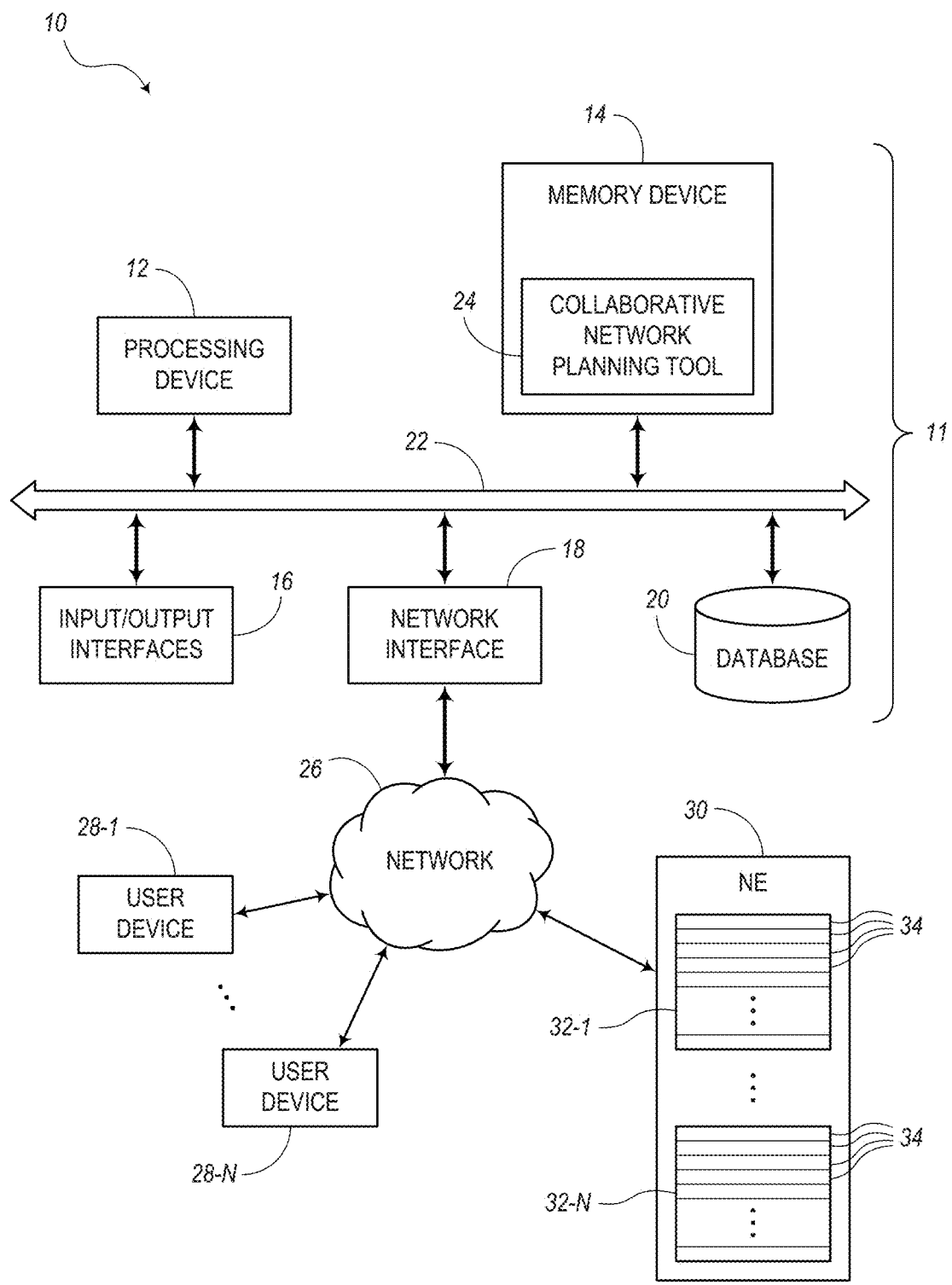
FIG. 1 is a block diagram illustrating a computing device configured to detect and resolve conflicts in collaborative network planning systems, according to various embodiments of the present disclosure.

The present disclosure relates to systems and methods for enabling one or more planners to create multiple, parallel proposals to change the equipment and/or services of a network (e.g., communications network). With the application of version control principles, the embodiments of the present disclosure are configured to (a) create parallel plan branches, (b) create incremental phase planning branches, (c) merge plan branches, (d) detect conflicts in merged plan branches, and (e) find inconsistencies in the plans that would prevent the plan from being fully functional post-deployment into a live network. The embodiments of the present disclosure are configured to improve upon conventional planning software tools to enable the detection and resolution of proposed plans specifically within the environment of communication networks. Thus, the planning tools described in the present disclosure may be referred to as "network planning tools."

It should be understood that the planning of the lifecycle of equipment and services in a network is a challenging task involving a myriad of information, including, for example, (a) physical equipment to be added to or deleted from the network in the future, as well as timestamps when the equipment will become available or unavailable, and (b) services (e.g., equipment provisioning) that will be added to or deleted from network equipment, which may be pre-existing in the network or yet-to-be added/removed, as well as timestamps when the services are to be provisioned or de-provisioned.

This information may be defined in a "plan" (or proposed plan) which is intended to be, but not yet, deployed in the live network. For the plan to be valid, any planned equipment or underlying service infrastructure on which the planned services depend must be deployed and available in the network at the time-of-service deployment. These complexities may be spread across many different pieces of existing or to-be-added equipment and services, each with a unique deployment/un-deployment or turn-up/turn-down timestamp. To further complicate matters, plans may be built on top of other plans with dependencies between plans. For example, imagine that "Plan 1" adds equipment to the network and "Plan 2" adds services that rely on the equipment in Plan 1. If Plan 1 were to be deleted, then Plan 2 would no longer be valid. Moreover, multiple authors may define or edit plans in parallel. Given all these complexities, the embodiments of the present disclosure provide a framework that can detect and resolve potential conflicts to meet this previously unmet need in the field.

It should be noted that the changes in a network include more than just textual changes as would be normally provided for other conventional systems. Common operations in VCS include branching (to create a parallel stream of development) and merging (to combine divergent parallel streams with a common ancestor) to enable parallel and distributed development. These concepts can be applied to the planning of network changes (e.g., augments, removals, etc.) to guide implementation of change management. Furthermore, if network plans are defined in a suitable format from which a VCS can determine differences, then not only do the concepts of distributed version control apply, but a VCS could be used to manage the branching and merging of network plans. This may be done as long as the VCS functionality to find and reconcile differences is extended to have domain-awareness for handling complex network planning cases (e.g., time-aware roll of services from one set of equipment to another).

FIG. 1 is a block diagram illustrating an embodiment of a management system 10 for managing collaborative network planning. The management system 10 includes a computing device 11 configured to detect and resolve conflicts in network planning systems. In the illustrated embodiment, the computing device 11 of the management system 10 may be a digital computing device that generally includes a processing device 12, a memory device 14, Input/Output (I/O) interfaces 16, a network interface 18, and a database 20. It should be appreciated that FIG. 1 depicts the computing device 11 in a simplified manner, where some embodiments may include additional components and suitably configured processing logic to support known or conventional operating features.

In some embodiments, the computing device 11 may be controlled by a network administrator, network manager, network operator for performing operations on a network 26. The network 26 may include a number of devices and various pieces of equipment configured to provide specific services. This network 26 (or a different network, such as private network) may also be in communication with a plurality of user devices 28-1, . . . , 28-N to enable one or more users (or planners) to manipulate the one or more user devices 28-1, . . . , 28-N to enter proposed plans in a collaborative manner for making changes to the equipment and/or services in the network 26. For example, as illustrated, a Network Element (NE) 30 may be part of or connected in the network 26 and may include specific network devices for providing network services. The NE 30 may include one or more chassis 32-1, . . . , 32-N, where each chassis 32 may include a number of slots 34. The slots 34 are configured to receive network cards (not shown), whereby the network cards may include a plurality of ports from which services may be provided to customers.

Each of the user devices 28-1, . . . , 28-N may include network planning functionality that can allow a corresponding user (planner) to propose changes. Also, the collaborative network planning tool 24 is configured to work with the different user devices 28-1, . . . , 28-N to collect the proposed changes to the network and consolidate the changes. Also, according to the various embodiments of the present disclosure, the collaborative network planning tool 24 is configured to determine if any conflict exists in any parallel branches of network change proposals.

The components of the computing system 11 (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the computing device by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the computing device and may include, for example, an internal hard drive connected to the local interface 22 in the computing device. Additionally, in another embodiment, the data store may be located external to the computing device and may include, for example, an external hard drive connected to the Input/Output (I/O) interfaces 16 (e.g., SCSI or USB connection). In a further embodiment, the data store may be connected to the computing device through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The computing device of the management system 10 further includes a collaborative network planning tool 24. The collaborative network planning tool 24 may be implemented in software and/or firmware and stored in the memory device 14. In some embodiments, the collaborative network planning tool 24 may be implement in hardware in the processing device 12. The collaborative network planning tool 24 may be implemented in any suitable combination of hardware, software, and/or firmware and may include logical instructions for enabling the processing device to perform certain functions for detecting and resolving conflicts in a collaborative planning system when proposed changes to a network include inconsistencies that would create one or more conflicts. Due to the nature of the environment of networks and network deployment, the collaborative network planning tool 24 provides additional functionality to conventional planning tools to meet the particular demands of network planning, management, and control.

The network interface 18 may be used to enable the computing device to communicate over a network, such as the network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 26.

The present disclosure relates to embodiments of network planning systems, methods, and software. Multiple people can make multiple plans and the network evolves as well. The present embodiments provide a way to handle changes between the planning software and the actual network and may borrow concepts from software version control. In a sense, the embodiments of the present disclosure are configured to model network changes in both space and time. For example, "space" may refer to multiple lines or branches, which may include different planners and/or different planning (sandbox) proposals. Also, "time" may refer to when each piece of equipment (e.g., network cards, etc.) are configured to be deployed in the network, equipment adding times, equipment removal times, etc. The time feature may also refer to when the equipment is configured to provide services through the network.

Figure 2:
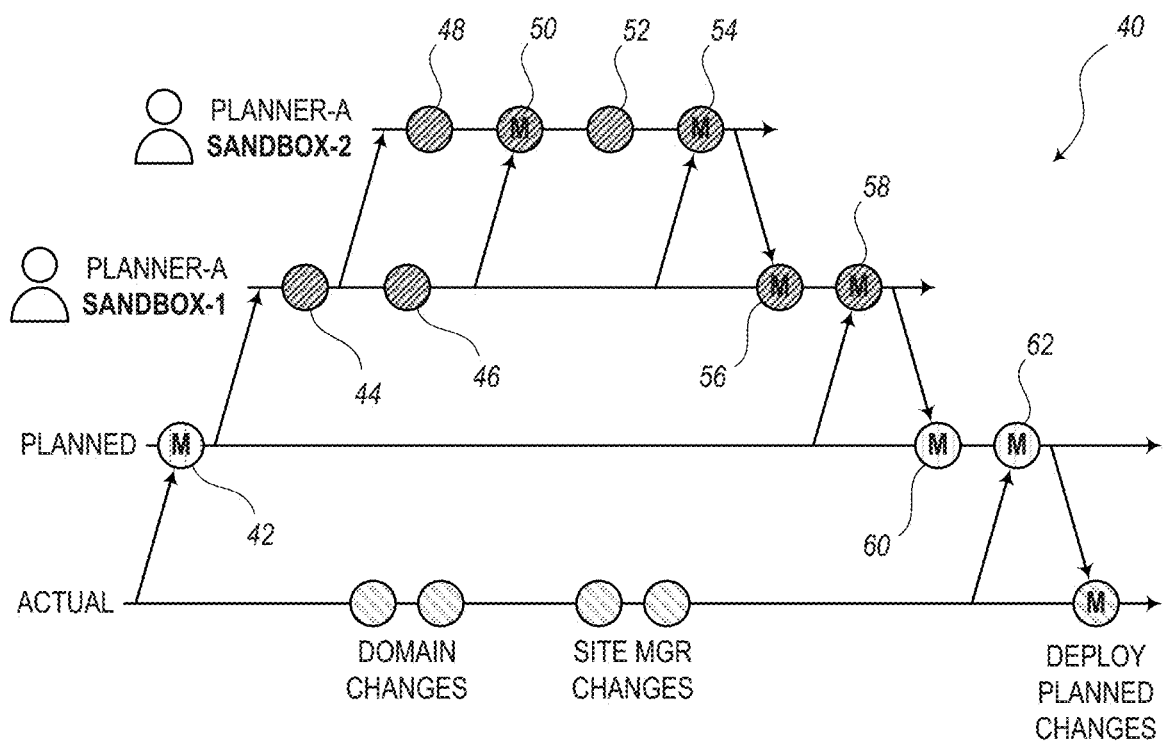
FIG. 2 is a diagram illustrating branches and merges of proposed changes by a single planner in a network, according to various embodiments.

FIG. 2 is a diagram 40 illustrating an example of branching and merging operations for handling proposed changes. As shown in this example, the diagram includes an ACTUAL line (or trunk) for showing the state of an actual network and changes made thereto. The diagram 40 also shows a PLANNED branch or line including branching and merging with respect to the ACTUAL trunk. Also, two parallel branches show examples of network changes that are proposed by a single planner (i.e., "Planner-A") in a network (e.g., changes to NE 30 in the network 26 shown in FIG. 1). The same planner in this example has two branches, labelled "Sandbox-1" and "Sandbox-2." Changes to the network (e.g., provisioning, domain changes, discovered Site Manager changes, etc.) are shown (in cyan) in the ACTUAL trunk and are shown along a timeline from left to right on the page. Changes made to planning integration branch are shown (in yellow) in the PLANNED branch. This branch collects changes (from the sandboxes) to be deployed at the next deployment milestone. Changes made to the planning sandbox branches (e.g., equipment add/delete, etc.) are shown (in magenta) in the Sandbox-1 and Sandbox-2 branches.

The embodiments of the present disclosure may be configured to analyze the differences between what the planning software includes (e.g., the PLANNED branch with yellow dots) and what the network actually looks like (e.g., the "actual" line with cyan dots). The timelines are shown where time proceeds from left to right with the changes with respect to time shown by the dots. Therefore, the present disclosure may be directed to the use of version control techniques for network planning. Planning software of the present disclosure may include a distributed tool to allow the single user (FIG. 2) to have multiple proposed branches or to allow multiple users to work concurrently, as described with respect to FIG. 3.

The collaborative network planning tool 24 may be configured to detect for incompatible changes in two or more parallel paths or sandboxes. The collaborative network planning tool 24 is configured to test for consistency before implementing changes in order to ensure that merging parallel plans makes logical sense and does not create a space or time conflict. In other words, a conflict may include the planning for two different devices to be planned for the same place at the same time. Another type of conflict may include planning for a port of some equipment to be planned for providing two different types of services in a situation where the port may not have sufficient bandwidth to handle the different services. The planning may therefore be changed as needed to resolve any conflicts. For example, if two different devices (e.g., network cards) are planned for use in the same slot (e.g., slot 34) of a chassis (e.g., chassis 32-1), the collaborative network planning tool 24 may be configured to instruct the planners to manually modify the planning descriptions such that some equipment is planned for a first time period and some other equipment is planned for a second (non-overlapping) time period.

Considering the branching/merging diagram 40 of FIG. 2, a series of network augment plans are collected on the PLANNED branch. The PLANNED branch is first synchronized to the ACTUAL deployed network at merge point 42 and is configured to apply the concepts of a branch merge operation (yellow circle). From the PLANNED branch, the planner (i.e., Planner-A) creates Sandbox-1 branch and adds (or creates plan to add) "Equipment 1" at action point 44 (magenta circle) to make a local change. From Sandbox-1, the planner creates the Sandbox-2 branch, then adds "Equipment 2" at action point 46 in Sandbox-1. In parallel, the planner also adds "Route 1 over Equipment 1" at action point 48.

In this example, the planner may then conduct a merge operation at merge point 50 on Sandbox-2, where Sandbox-2 is able to pick up Equipment 2. Then, on Sandbox-2, the planner adds "Route 2 over Equipment 2" at action point 52. At merge point 54, the collaborative network planning tool 24 is configured to check for conflicts between the two sandboxes. This may also be done at merge point 56. Also, the collaborative network planning tool 24 is configured to perform another merge operation at merge point 58 to check for conflicts with any other undeployed plans from the PLANNED branch. Merge point 60 includes merging the collaborative plans from the sandboxes with any other undeployed plans. Next, merge point 62 is configured to include checking for conflicts with the deployed network and resolving any conflicts if necessary, assuming that resolution is possible. The collaborative network planning tool 24 may be configured to recommend changes to the plans (e.g., on the Sandbox-2 branch or on both the Sandbox-1 and Sandbox-2 branches) in order to resolve any conflicts.

Thus, when the planner is finished making changes, he or she may utilize the merge operations, which may be executed by the collaborative network planning tool 24. Thus, the planner can merge the PLANNED branch again to ensure no conflicts have been introduced, and then push the changes back to the PLANNED branch. At each merge points, the collaborative network planning tool 24 may be augmented with domain-awareness that allow it to check for and notify of any conflicting changes.

Figure 3:
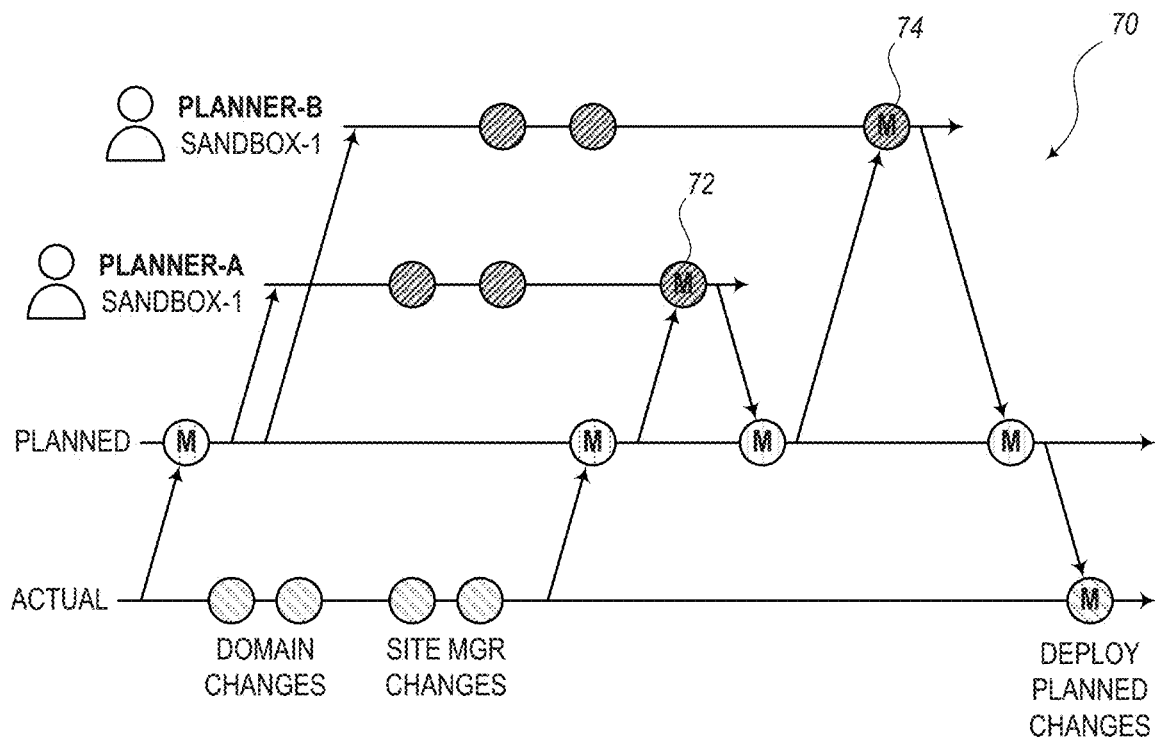
FIG. 3 is a diagram illustrating branches and merges of proposed changes by multiple planners in a network, according to various embodiments.

FIG. 3 is a diagram 70 illustrating an example of branching and merging of network changes proposed by multiple planners in a network. Again, there is an ACTUAL branch and a cumulative PLANNED branch. However, in this example, the two planners each have one sandbox branch, which are developed in parallel. For example, the sandbox branches may be formed at about the same time and each planner may make changes to add equipment, routes, services, etc. At merge point 72, the collaborative network planning tool 24 may be configured to check conflicts of proposed plans by Planner-A with the deployed network, which in this example has been updated with domain changes and Site Manager changes. This is merged back into the PLANNED branch. Then, at merge point 74, the collaborative network planning tool 24 is configured to check conflicts with both the deployed network and the Planner-A changes. This too is merged back into the PLANNED branch. Once conflicts are resolved, the planned changes can be deployed in the actual network, which may be shown on the ACTUAL trunk.

Consider the following simple example. Suppose the following JavaScript Object Notation (JSON) snippet defines the existence of an equipment chassis with an available slot on a PLANNED branch of FIG. 3:

```
{
  "equipment": [
    {
      "id": "e1",
      "Network Line System 16-Slot Chassis",
      "slot1": "empty",
    },
  ],
  "services": [ ]
}
```

Suppose that Planner-A populates that slot and adds a service on his or her sandbox branch that utilizes that slot:

```
{
  "equipment": [
    {
      "id": "e1",
      "name": "Network Line System 16-Slot Chassis",
      "slot1": "Card-Planner-A",
    },
  ],
  "services": [
    {
      "id": "s1",
      "name": "Service-Planner-A",
      "eqpt-id": "1",
      "card-id": "slot1",
    }
  ]
}
```

Meanwhile, Planner-B also creates a service utilizing that slot in his sandbox branch:

```
{
  "equipment": [
    }
      "id": "e1",
      "name": "Network Line System 16-Slot Chassis",
      "slot1": "Card-Planner-B",
    },
  ],
  "services": [
    {
      "id": "s2",
      "name": "Service-Planner-B",
      "eqpt-id": "1",
      "card-id": "slot1",
    }
  ]
}
```

When Planner-A merges with the PLANNED branch, there will not be any merge conflicts, so he or she will push his or her changes and they will be merged into PLANNED. However, when Planner-B merges with the PLANNED branch, the collaborative network planning tool 24 may be configured to warn Planner-B that there are conflicts with the following highlighted lines because it will recognize that Planner-A and Planner-B have made changes to the same line of the source:

```
{
  "equipment": [
    {
      "id": "1",
      "name": "Network Line System 16-Slot Chassis",
      "slot1": "Card-Planner-B",
    }
  ],
  "services": [
    {
      "id": "s2",
      "name": "Service-Planner-B",
      "eqpt-id": "1",
      "card-id": "slot1",
    }
  ]
}
```

The collaborative network planning tool 24 can be used to manage conflict detection and resolution in the merging of the text representing multiple plans. However, unlike conventional planning software, which does not understand the meaning of the data in the plan with respect to a communications network (e.g., network 26), the collaborative network planning tool 24 is able to provide additional functionality to implement collaborative planning tasks for the specific intricacies of a network environment. To ensure that the plan data remains self-consistent (e.g., that equipment A depended upon by Service B is defined and available in the plan), the collaborative network planning tool 24 may employ unit tests which add domain-aware functionality. These tests may be run on a merged branch to ensure that the data remains self-consistent.

As an example, note that no conflicts were highlighted in the services section (e.g., no textual conflict). This is because Planner-A and Planner-B did not change the same line of code. However, there is a potential conflict here. Specifically, Planner-B's service requires a different card type than Planner-A's slot 1. Therefore, at every merge point, the collaborative network planning tool 24 can run unit tests which validate the consistency of the data against domain-aware rules to ensure that the data remain self-consistent. Examples below describe detailed explanations of merge conflict detection, data validation, and resolution according to the embodiments of the present disclosure.

Consider the real-life example of "Phase Planning," where dependencies across multiple phases of network planning must be tracked. Imagine a Phase 1, where the user needs to replace a fiber section with a new one with a different set of equipment, followed by a Phase 2 where service modifications are made on that fiber section. Similar to the management of software branches, these Planning phases can be managed using the concepts described above. A Phase 1 branch will be created from ACTUAL and modified to replace the fiber section. A Phase 2 branch will then be created from the Phase 1 branch where the future service modifications are made. Any changes made thereafter to the ACTUAL branch would be synced to the Phase 1 & 2 branches using a diff/merge functionality of the collaborative network planning tool 24 augmented by domain-aware extensions. When Phase 1 & 2 branches are complete they would be pushed to the ACTUAL branch for deployment.

The value of using the concepts above becomes even further apparent when multiple network layers (e.g., multi-layer planning as it relates to the OSI Model) come into play, thereby adding complexity and inter-layer dependencies in which an upper layer service (e.g., an IP layer service, Plan B, etc.) depends on a lower layer service and equipment (e.g., a Dense Wavelength Division Multiplexing (DWDM) optical transponder 100Gb Ethernet service Plan A). Without Plan A, Plan B cannot happen and would need to be deferred until Plan A is implemented.

Figure 4:
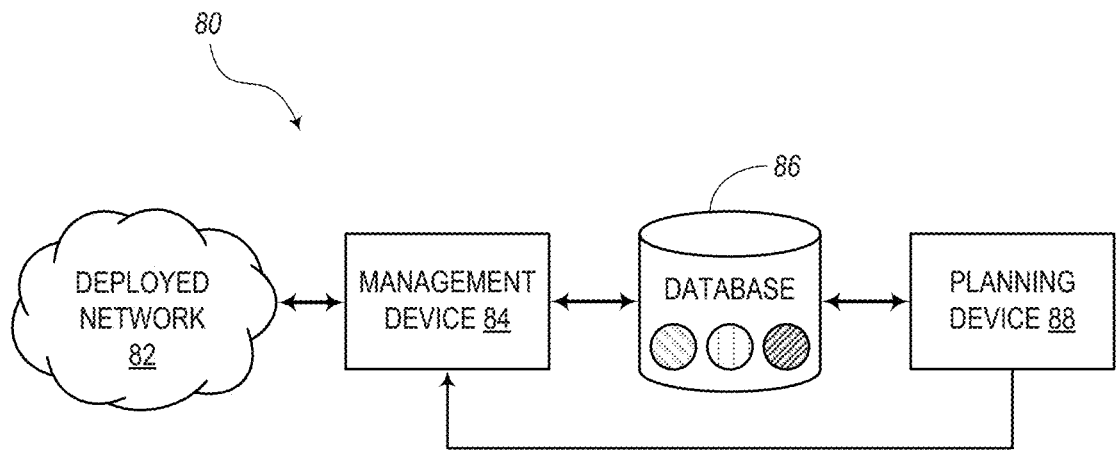
FIG. 4 is a block diagram illustrating a management and planning system for enabling changes in a network, according to various embodiments.

FIG. 4 is a block diagram illustrating an embodiment of a management and planning system 80 for enabling changes in a network. The management and planning system 80 is configured to monitor and oversee changes made to a deployed network 82 (e.g., network 26). A management device 84 may include management functionality, control functionality, and/or planning functionality. The management device 84 is configured to keep the ACTUAL network view up-to-date. A database 86 is configured to store all the branches (e.g., the ACTUAL branch, the PLANNED branch, and multiple sandbox branches, etc.) of the network view. A planning device 88 may be configured to communicate with the various user devices 28-1, . . . , 28-N to receive planning information or planning descriptions. The planning device 88 can be a computing device 11 that executes the collaborative network planning tool 24. The planning device 88 may also make changes to the PLANNED branch and multiple sandbox branches, as stored in the database 86. Also, the planning device 88 may work with the various planners to resolve conflicts (e.g., manually and/or automatically) to obtain a conflict-free plan. This conflict-free plan can be forwarded to the management device 84 to implement the plan in the deployed network 82.

Figure 5:
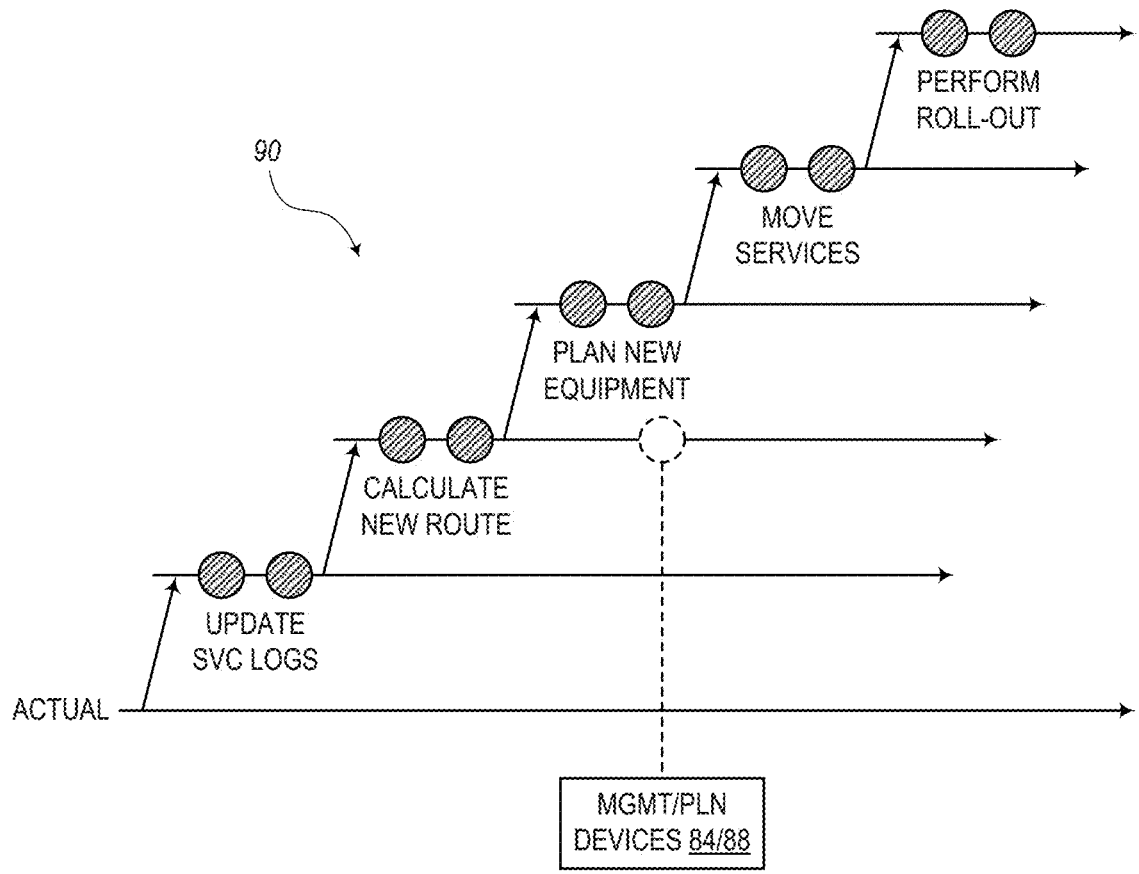
FIG. 5 is a diagram illustrating parallel branches of network changes, according to various embodiments.

FIG. 5 is a diagram illustrating a plan 90 having parallel branches of network changes and may be associated with various operations in the management and planning system 80 of FIG. 4. The plan 90 may include time-awareness achieved by focusing the management and planning system 80 (e.g., the management device 84 and/or the planning device 88) on different branches of the plan 90.

I. Equipment Conflict Detection & Resolution

Figure 6:
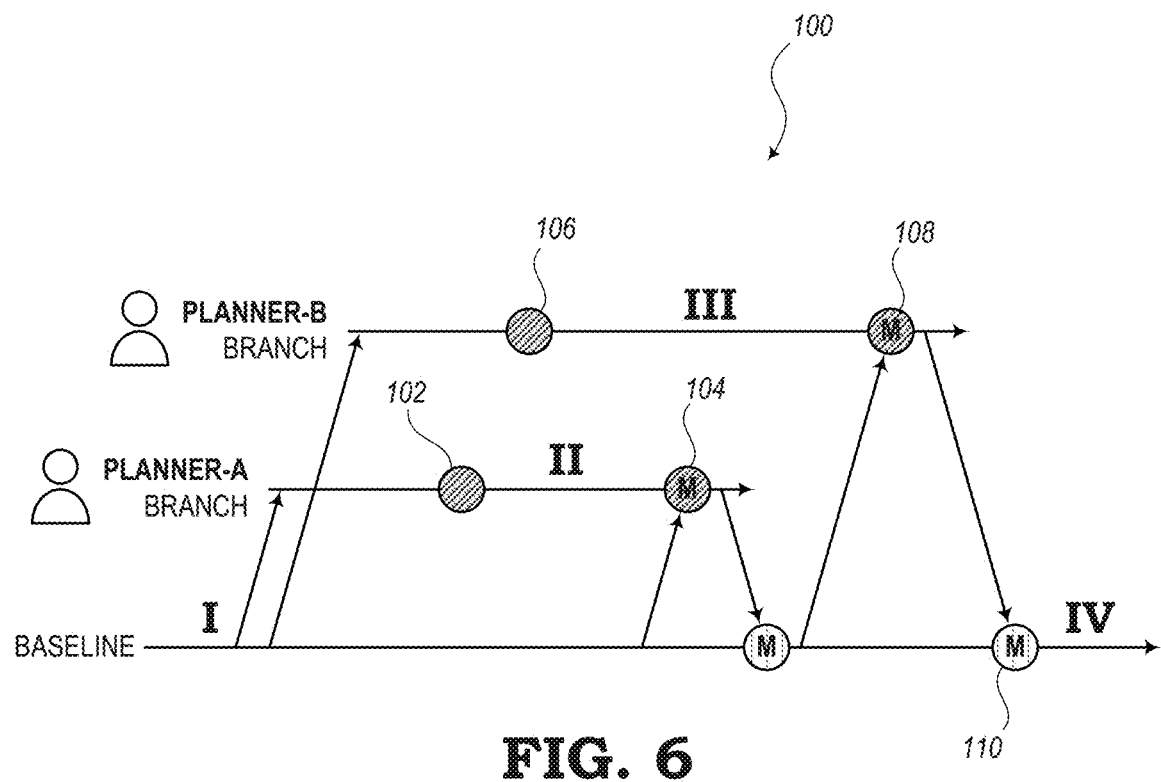
FIG. 6 is a diagram illustrating branches and merges of proposed changes by multiple planners in a network, according to various embodiments.

FIG. 6 is a diagram illustrating a plan structure 100 that include various branching and merging lines that represent actions associated with changes proposed by multiple planners for implementation in a network (e.g., network 26, deployed network 82, etc.). It may be noted that FIG. 6 include similarities to FIG. 3 with two planners (i.e., Planner-A and Planner-B), except that the ACTUAL trunk is not shown in FIG. 6. The PLANNED branch of FIG. 3 is shown as a BASELINE branch in FIG. 6. The plan structure 100 include multiple points (i.e., Point I, Point II, Point III, and Point IV) representing processes of the collaborative network planning tool 24 and/or management and planning system 80 at different times in the collaborative planning process. What follows are specific examples of the types of merge conflicts that might arise from two different planners making changes to the same equipment baseline (i.e., BASELINE branch). The collaborative network planning tool 24 and/or management and planning system 80 may be configured to perform validation before allowing the merge. The plan structure 100 is referred to in the following description, which includes various examples to assist in the explanation of the state of the planned descriptions as described in source code at each point.

A. Example 1: Planner A & Planner B Add Conflicting Equipment

In this example, Planner A and Planner B start with the same source from the BASELINE branch (e.g., PLANNED branch), at Point I. It may be noted that "uuid" in the source code represents the universally unique identifier. The source code describes a chassis with no cards inserted:

```
{
  "equipment": [
    {
      "uuid": "8de37417-db29-4020-ae21-59e2e7fbabe6",
      "description": "Network Ln System 2-Slot Chassis",
      "slots": {
        "1": "None",
        "2": "None"
      }
    }
  ],
  "services": [ ]
}
```

Planner A creates a branch from the BASELINE and adds a network card in slot 1. The source code at Point II is as follows: The collaborative network planning tool 24 and/or management and planning system 80 may perform a merge check for Planner A with the baseline. There are no conflicts detected, so a merge is permitted:

```
{
  "equipment" : [
    {
      "uuid": "8de37417-db29-4020-ae21-59e2e7fbabe6",
      "name": "Chassis-1",
      "description": " Network Ln System 2-Slot Chassis",
      "slots": {
        "1": {
          "uuid":    "0f0d2336-e1c2-4561-967c-ca0c03457807",
          "description": "WLAi MOTR"
        },
        "2": "None"
      }
    }
  ],
  "services": [ ]
}
```

Planner B also creates a branch from the baseline before Planner A has merged his changes. At Point II, Planner A changes are made. Effectively, Planner A and Planner B are working on the same code in parallel. Planner B adds a different card type in the same slot, whereby the source code after Planner B's changes at Point III is as follows:

```
{
  "equipment" : [
    {
      "uuid": "8de37417-db29-4020-ae21-59e2e7fbabe6",
      "name": "Chassis-1",
      "description": " Network Ln System 2-Slot Chassis",
      "slots": {
        "1": {
          "uuid":    "bdc57424-d93f-412a-a21b-abfb0a8307af",
          "description": "WL5e MOTR"
        },
        "2": "None"
      }
    }
  ],
  "services": [ ]
}
```

Obviously, two different cards cannot exist in the same physical chassis slot at the same time. Thus, when Planner B attempts to merge his changes with the BASELINE branch, conflicts are detected. This is the type of conflict that would be detected by a diff analysis of the source code showing text changes in the same line of code on two different branches. The conflicts (highlighted text) must be resolved before Planner B's changes can be merged to the BASELINE.

An example resolution, which would require manual code changes by Planner B, would be to move the "WL5e MOTR" card to slot 2 of the chassis. Once complete, a merge of planner B's code with the baseline would be allowed. This would provide equipment reconciliation at Point IV, which is the BASELINE after merging Planner A & B branches. The post-merge code at point IV would be as follows:

```
{
  "equipment" : [
    {
      "uuid": "8de37417-db29-4020-ae21-59e2e7fbabe6",
      "name": "Chassis-1",
      "description": " Network Ln System 2-Slot Chassis",
      "slots": {
        "1": {
          "uuid":       "0f0d2336-e1c2-4561-967c-ca0c03457807",
          "description": "WLAi MOTR"
        },
        "2": {
          "uuid":       "bdc57424-d93f-412a-a21b-abfb0a8307af",
          "description": "WL5e MOTR"
        }
      }
    }
  ],
  "services": [ ]
}
```

B. Example 2: Planner A & Planner B Add Equipment that do not Conflict when Time Awareness is Included This example is similar to Example 1 above. However, in this case, the card added by Planner A & B has a turn-up date (i.e., the date when the card is added to the chassis) and a turn-down date (i.e., the date when the card is removed from the chassis). The branch/merge flow is the same as Example 1. However, the decision to merge Planner B's changes now can be time-aware in order to determine whether the physical conflict (e.g., differing cards in the same slot) occurs at the same point in time.

Planner A and Planner B start with the same source code from the BASELINE branch, at Point I, which describes a chassis with no cards inserted:

```
{
  "equipment": [
    {
      "uuid": "8de37417-db29-4020-ae21-59e2e7fbabe6",
      "description": "Network Ln System 2-Slot Chassis",
      "slots": {
        "1": "None",
        "2": "None"
      }
    }
  ],
  "services": [ ]
}
```

Planner A adds a "WLAi MOTR" card in slot 1, with turn-up and turn-down times of June 1 and June 30, respectively. The source code at Point II is shown below. There are no conflicts detected when comparing this to the BASELINE branch, so a merge is permitted:

```
{
  "equipment": [
    {
      "uuid": "8de37417-db29-4020-ae21-59e2e7fbabe6",
      "name": "Chassis-1",
      "description": " Network Ln System 2-Slot Chassis",
      "slots": {
        "1": {
          "uuid":       "0f0d2336-e1c2-4561-967c-ca0c03457807",
          "description": "WLAi MOIR",
          "turn-up date": "2021-06-01",
          "turn-dn date": "2021-06-30"
        },
        "2": "None"
      }
    }
  ],
  "services": [ ]
}
```

On a parallel branch, Planner B adds a "WL5e MOTR" card in the same slot also with a turn-up and turn-down time of July 1 and July 30, respectively. The source code after Planner B changes at point III is as follows:

```
{
  "equipment": [
    {
      "uuid": "8de37417-db29-4020-ae21-59e2e7fbabe6",
      "name": "Chassis-1",
      "description": " Network Ln System 2-Slot Chassis",
      "slots": {
        "1": {
          "uuid":       "bdc57424-d93f-412a-a21b-abfb0a8307af",
          "description": "WL5e MOTR",
          "turn-up date": "2021-07-01",
          "turn-dn date": "2021-07-30"
        },
        "2": "None"
      }
    }
  ],
  "services": [ ]
}
```

In this case, the same source code conflicts exist when doing a simple text comparison. However, this is the point at which the time-aware intelligent code of the collaborative network planning tool 24 would need to be applied to determine that, although the same physical slot is occupied by different card types, it is never at the same point in time. Slot 1 has a "WLAi MOTR" card from June 1 through June 30, and a "WL5e MOTR" card from July 1 through July 30. Therefore, there is no conflict in this case.

Another example includes a Baseline, Planner A branch, and Planner B branch and a comparison of the code at Points I, II, and III. Therefore, the time-aware code would intelligently combine and allow the merge Planner B's changes to provide time-aware equipment reconciliation at Point IV (e.g., BASELINE after merging Planner A & B branches). The source at Point IV post-merge would be as follows:

```
{
  "equipment": [
    {
      "uuid": "8de37417-db29-4020-ae21-59e2e7fbabe6",
      "name": "Chassis-1",
      "description": " Network Ln System 2-Slot Chassis",
      "slots": {
        "1": {
          {
            "uuid": "0f0d2336-e1c2-4561-967c-
              ca0c03457807",
            "description": "WLAi MOIR",
            "turn-up date": "2021-06-01",
            "turn-dn date": "2021-06-30"
          },
          {
            "uuid": "bdc57424-d93f-412a-a21b-
              abfb0a8307af",
            "description": "WL5e MOIR",
            "turn-up date": "2021-07-01",
            "turn-dn date": "2021-07-30"
          }
        ],
        "2": "None"
      }
    }
  ],
  "services": [ ]
}
```

II. Service Conflict Detection & Resolution

What follows are specific examples of the types of merge conflicts that might arise from two different planners adding "services" on top of the same equipment baseline, after equipment conflicts have been resolved (as described above). The collaborative network planning tool 24 may perform validation before allowing the merge. Again, reference can be made to the branching diagram of FIG. 6 regarding the following examples to assist in the explanation of the state of the source code at each point.

A. Example 1: Planner A & Planner B Add Conflicting Services

In this example, Planner A and Planner B each add a 100GE service on top of an existing 100GE port. The code on the baseline branch and Planner NB branches.

While text conflicts exist, the collaborative network planning tool 24 includes domain-aware intelligence that can look beyond the text conflicts to determine that the real problem in this case is that each of the added services utilize 100% of the available bandwidth of the port. The collaborative network planning tool 24 may flag Planner B to indicate this issue. He or she may then elect to add a second 100GE port to resolve the issue. The service-add reconciliation at Point IV may include the final merged code, which may then be as follows:

```
{
  "equipment": [
    {
      "uuid": "8de37417-db29-4020-ae21-59e2e7fbabe6",
      "name": "Chassis-1",
      "description": "Network Ln System 2-Slot Chassis",
      "slots": {
        "1": {
          "uuid":    "0f0d2336-e1c2-4561-967c-
            ca0c03457807",
          "description": "WLAi MOTR 10-port card",
          "ports": {
            "3": {
              "uuid":    "27c29637-7825-4b8a-
                b64a-622d2d59b373",
              "description": "NTTP84BA XFP
                100GE"
            },
            "4": {
              "uuid":    "f085ea47-9bfe-4126-
                92e4-286e6483407f",
              "description": "NTTP84BA XFP
                100GE"
            }
          }
        },
        "2": "None"
      }
    }
  ],
  "services": [
    {
      "uuid": "efe04efd-802e-4acf-a646-3be61e96b903",
      "description": "100GE Service for Customer-A on
        Chassis-1-1-3",
      "bandwidth": "100E9",
      "dependencies": [
        "8de37417-db29-4020-ae21-59e2e7fbabe6",
        "0f0d2336-e1c2-4561-967c-ca0c03457807",
        "27c29637-7825-4b8a-b64a-622d2d59b373"
      ]
    },
    {
      "uuid": "08732882-58cf-448b-bbb0-76501af71412",
      "description": "100GE Service for Customer-B on
        Chassis-1-1-4",
      "bandwidth": "100E9",
      "dependencies": [
        "8de37417-db29-4020-ae21-59e2e7fbabe6",
        "0f0d2336-e1c2-4561-967c-ca0c03457807",
        "f085ea47-9bfe-4126-92e4-286e6483407f"
      ]
    }
  ]
}
```

In contrast, consider the case that each service is only 10GE. If the validation code had multi-layer domain awareness, it would recognize that a 100GE port can carry up to ten (10×) 10GE services and therefore there is no conflict in having two (2×) 10GE services. The domain-aware merge code would allow the merge of Planner B's original changes in addition to Planner A's changes.

B. Example 2: Planner A & Planner B Add Services that do not Conflict when Time Awareness is Included This example is similar to the issue described in the previous example. The scenario remains the same, with Planner A and Planner B each adding a service that consumes 100% of the bandwidth of an existing port. The difference in this example, however, is that the services have turn-up and turn-down times, and do not overlap in time. Therefore, time-aware merge code could intelligently combine the files and allow the merge of all the changes.

A CLI can show code on the baseline branch and Planner NB branches and is configured to highlight the textual conflicts of the parallel proposed changes in the network plan. The time-aware service reconciliation at Point IV includes the BASELINE after merging Planner A & B branches. Also, it is possible to compare the code at Points I, II, and III. The final code after merge at point IV would be as follows:

```
{
  "equipment":
    {
      "uuid": "8de37417-db29-4020-ae21-59e2e7fbabe6",
      "name": "Chassis-1",
      "description": " Network Line System 2-Slot
      Chassis",
      "slots": {
        "1": {
          "uuid":        "0f0d2336-e1c2-4561-967c-
          ca0c03457807",
          "description": "WLAi MOTR 10-port card",
          "ports": {
            "3": {
              "uuid": "27c29637-7825-4b8a-
              b64a-622d2d59b373",
              "description": "NTTP84BA XFP
              100GE"
            }
          }
        },
        "2": "None"
      }
    }
  ],
  "services": [
    {
      "uuid": "efe04efd-802e-4acf-a646-3be61e96b903",
      "description": "100GE Service for Customer-A on
      Chassis-1-1-3",
      "bandwidth": "100E9",
      "dependencies": [
        "8de37417-db29-4020-ae21-59e2e7fbabe6",
        "0f0d2336-e1c2-4561-967c-ca0c03457807",
        "27c29637-7825-4b8a-b64a-622d2d59b373"
      ],
      "turn-up date": "2021-08-01",
      "turn-dn date": "2021-08-30"
    },
    {
      "uuid": "08732882-58cf-448b-bbb0-76501af71412",
      "description": "100GE Service for Customer-B on
      Chassis-1-1-3",
      "bandwidth": "100E9",
      "dependencies": [
        "8de37417-db29-4020-ae21-59e2e7fbabe6",
        "0f0d2336-e1c2-4561-967c-ca0c03457807",
        "27c29637-7825-4b8a-b64a-622d2d59b373"
      ],
      "turn-up date": "2021-09-01",
      "turn-dn date": "2021-09-30"
    }
  ]
}
```

Processes for Detecting and Resolving Network Planning Conflicts

Figure 7:
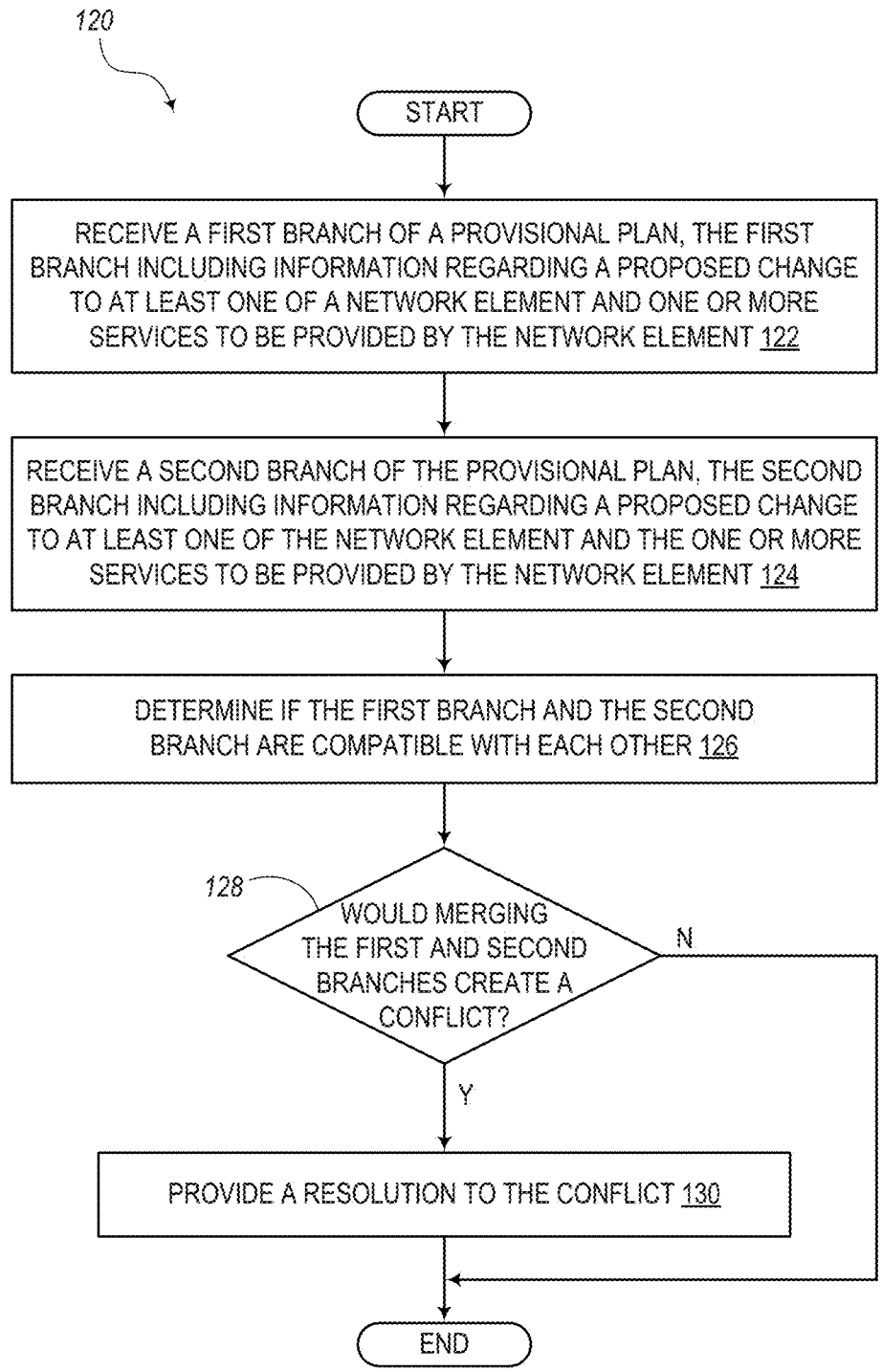
FIG. 7 is a flow diagram illustrating a general process for detecting and resolving conflicts in a network plan, according to various embodiments.

FIG. 7 is a flow diagram showing an embodiment of a process 120 generally configured for detecting and resolving conflicts in a network plan. In this embodiment, the process 120 includes a step of receiving a first branch of a provisional plan, as indicated in block 122. The first branch in this case includes information regarding a proposed change to at least one of a network element and one or more services to be provided by the network element. The process 120 also includes a step of receiving a second branch of the provisional plan, as indicated in block 124. The second branch in this case includes information regarding a proposed change to at least one of the network element and the one or more services to be provided by the network element. Also, the process 120 includes determining if the first branch and the second branch are compatible with each other, as indicated in block 126. The process 120 also includes determining whether or not the step of merging the first and second branches would create a conflict, as indicated in decision diamond 128. In response to determining that merging the second branch with the first branch would create a conflict (i.e., "Y" in decision diamond 128), the process 120 includes the set of providing a resolution to the conflict. The determining takes place one of before the first branch has been committed and after the first branch has been committed.

According to some embodiments, the step of determining if the first branch and the second branch are compatible with each other may include the step of performing an equipment conflict analysis and a service conflict analysis, as described below with respect to FIGS. 8A-8D. For example, the equipment conflict analysis may include the step of analyzing a network card planned for use in a slot of a chassis of the network element to determine if a different network card is also planned for use in the same slot at the same time. The service conflict analysis may include, for example, the step of analyzing one or more ports of one or more network cards to determine if different services are planned to be provisioned from the same one or more ports.

The process 120 may be performed in a management system (e.g., management system 10) to allow collaboration between multiple users (e.g., utilizing user devices 28-1, ..., 28-N). For example, the first branch may be received from a first device associated with a first user and the second branch may be received from a second device associated with the second user. In some embodiments, the user devices 28-1, ..., 28-N may include a user interface (e.g., Command Line Interface (CLI)) for enabling the users to view planning descriptions and potential conflicts. The process 120 may also include highlighting code in the CLI to show textual conflicts between the first branch and the second branch in one or more of the user devices.

Also, the process 120 may further be defined whereby the step of providing a resolution to the conflict may include recommending one or more modifications to at least one of the first branch and second branch. For example, recommending the one or more modifications may include: a) suggesting that a conflicting network card be planned for a different slot available in the network element, b) suggesting that time constraints be added or edited to allow different network cards planned for the same slot in the network element to fill the same slot at different times, c) suggesting that a service planned on a conflicting port of a network card be moved to a different port available on the network card, and/or d) suggesting that time constraints be added or edited to allow a port planned for providing conflicting services to provide the services at different times.

In some embodiments, the first branch and the second branch may include proposed changes at multiple network layers addition. Thus, the step of providing the resolution may further include inter-layer dependencies. Also, the step of determining if the first branch and the second branch are compatible with each other may also include the use of version control functionality.

FIGS. 8A-8D, when combined together, form a process 140 according to another embodiment. The process 140 is also configured for detecting and resolving conflicts in a network plan. In the illustrated embodiment of FIG. 8A, the process 140 includes considered a first (or next) chassis of a network element, as indicated in block 142. The process 140 also includes the step of analyzing the planned descriptions for a first (or next) slot in the chassis, as indicated in block 144. Also, the process 140 includes performing an equipment conflict analysis, as indicated in block 146. The equipment conflict analysis is described in more detail below with respect to FIG. 8B. The process 140 further includes performing a service conflict analysis, as indicated in block 148. The service conflict analysis is described in more detail below with respect to FIGS. 8C and 8D.

After analyzing the first slot on the first chassis, the process is configured to determine if there are more slots in the chassis, as indicated in decision diamond 150. If so, the process 140 returns back to block 144 to analyze the planning descriptions for the next slot in the chassis. If it is determined in decision diamond 150 that there are no more slots in this chassis, the process 140 proceeds to decision diamond 152. At this point, the process 140 determines if there are more chassis to analyze in the network element. If so, the process 140 returns back to block 142 to consider the next chassis. Otherwise, if the network element has been fully analyzed, the process 140 comes to an end.

Figure 8A:
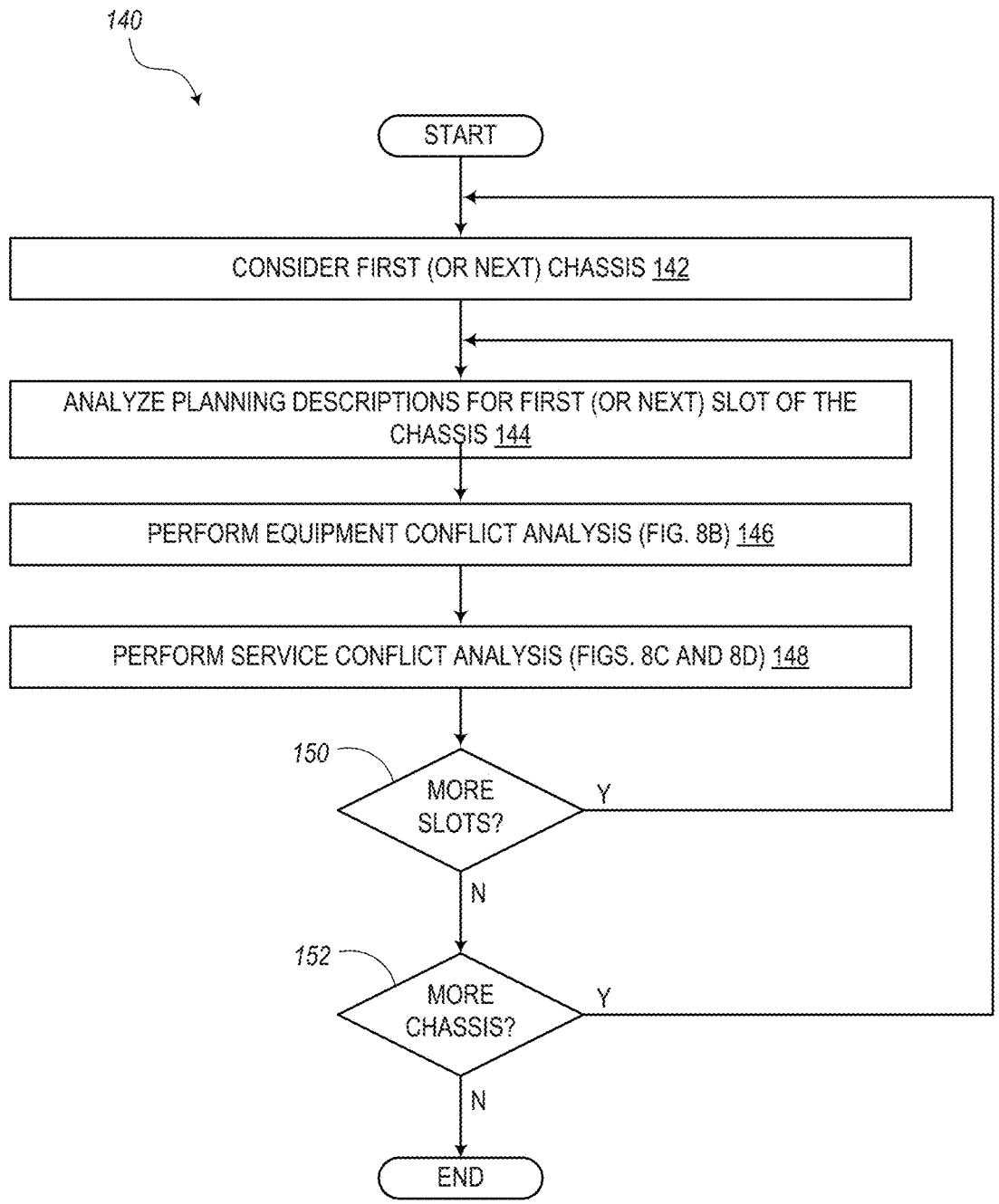
FIGS. 8A-8D, in combination, form a flow diagram illustrating a process for detecting and resolving conflicts in a network plan, according to various embodiments.
Figure 8B:
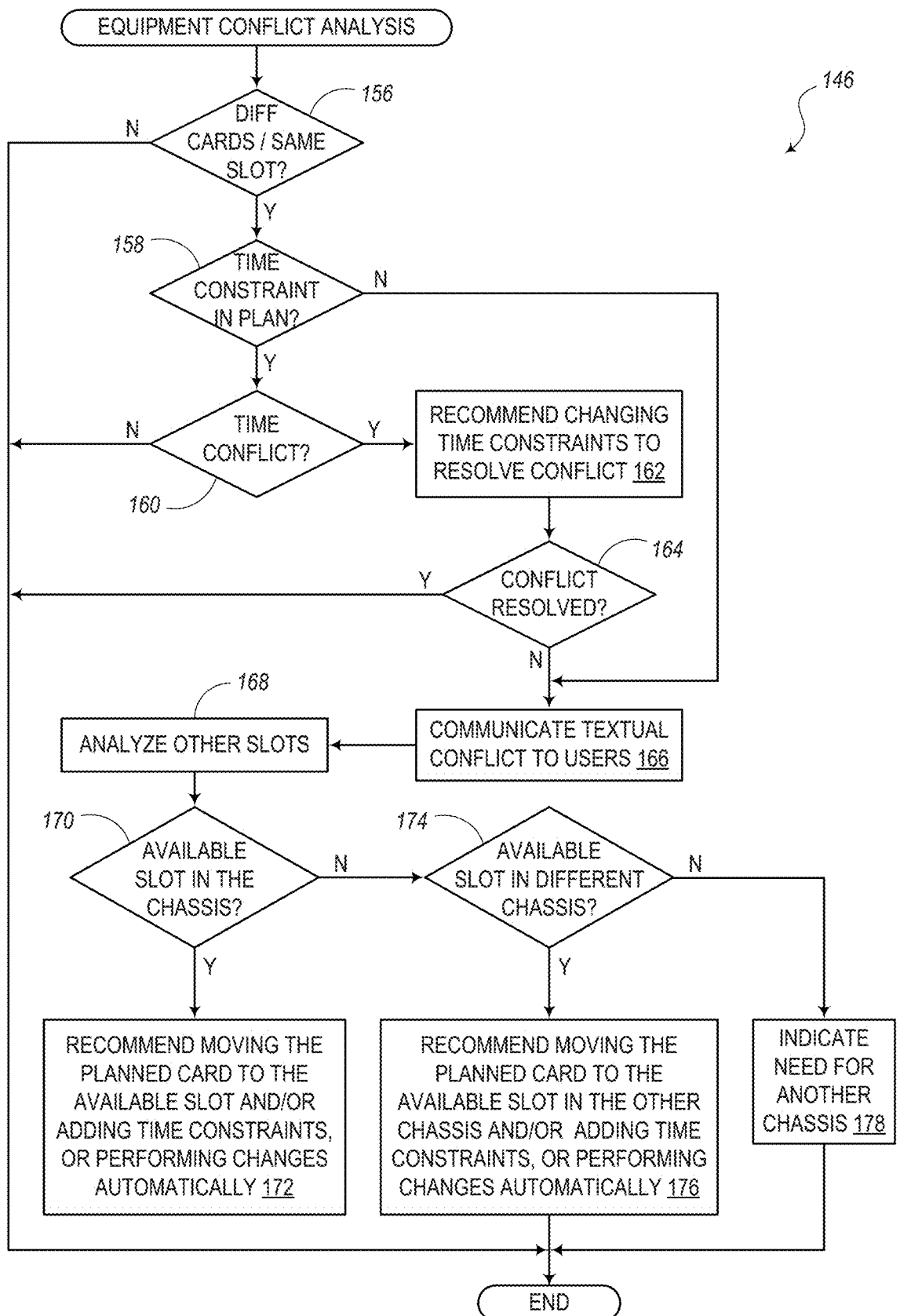

FIG. 8B shows a sub-routine of the equipment conflict analysis of block 146 of FIG. 8A for analyzing planning descriptions in a collaborative network planning system to determine if there are any conflicts with respect to the network equipment. The equipment conflict analysis sub-routine 146 includes determining if different cards are planned for the same slot, as indicated in decision diamond 156. If there are no conflicts with respect to collaborative planning where two (or more) different cards are planned to be installed in the same slot of the same chassis, then there is no equipment conflict and the equipment conflict analysis 146 comes to an end. However, if there is such a conflict, the sub-routine 146 proceeds to decision diamond 158.

As indicated in the decision diamond 158, the sub-routine 146 includes determining if there are any time constraints in the collaborative plans to specifically provide a timeframe when the pieces or equipment are to be installed. If not, the sub-routine 146 skips ahead to block 166. If there are time constraints (e.g., equipment A is planned for installment in slot 1 from Jun. 1, 2021, to Jun. 30, 2021), the sub-routine 146 is configured to determine if there are any equipment conflicts during the specific times (e.g., two different pieces of equipment having overlapping time periods for installation in the same slot), as indicated in decision diamond 160. If there are no conflicts, the sub-routine 146 ends. However, if there is a conflict, the sub-routine 146 may optionally include the step of recommending that the planners change the time constraints to resolve the conflict, as indicated in block 162. Decision diamond 164 then determines if the conflict has been resolved. If so, the sub-routine 146 end. Otherwise, the sub-routine 146 proceeds to block 166.

Block 166 includes the step of communicating that there is a textual conflict in the collaborative plans. This communication may be provided to the users by displaying the planning descriptions via a CLI and highlighting the textual conflicts. The sub-routine 146 also includes analyzing other slots, as indicated in block 168, to check for availability. Decision diamond 170 includes the step of determining if there is an available slot in the chassis. If so, the sub-routine 146 proceeds to block 172, which includes the step of recommending the proposed plan be changed by moving the planned card to the available slot. Block 172 may alternatively or additionally include recommending the adding of time constraints to resolve the conflict, according to some embodiments. Furthermore, block 172, in various implementations, may include automatically performing the changes in the planning descriptions to resolve the issue by moving the conflicting card to the available slot.

If it is determined in decision diamond 170 that there is not an available slot in the same chassis, the sub-routine 146 is configured determine if there is an available slot in a different chassis of the network element, as indicated in decision diamond 174. If there is an available slot in a different chassis of the network element, the sub-routine 146 goes to block 176, which includes the step of recommending the proposed plan be changed by moving the planned card to the available slot in the other chassis. Block 176 may alternatively or additionally include recommending the adding of time constraints, according to some embodiments. Furthermore, block 172, in various implementations, may include automatically performing the changes in the planning descriptions to resolve the issue by moving the conflicting card to the available slot in the other chassis. If it is determined in decision diamond 174 that there is not an available slot is a different chassis, the sub-routine 146 goes to block 178, which includes the step of indicating (e.g., to the collaborating planner, a network administrator, et al.) a need for another chassis to be added to the network element. After block 172, 176, 178, the sub-routine 146 ends and the process 140 proceeds to the service conflict analysis 148.

Figure 8C:
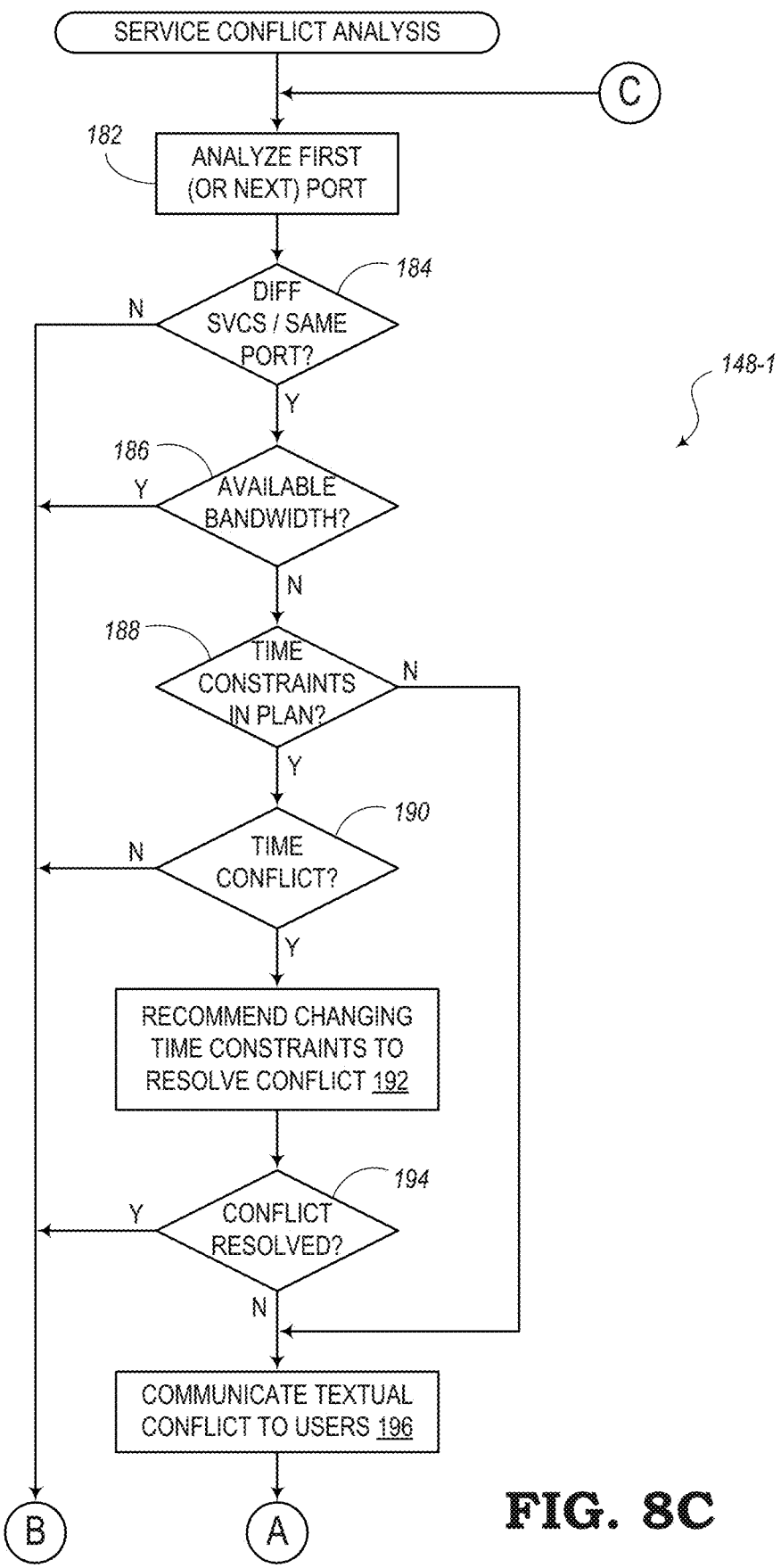
Figure 8D:
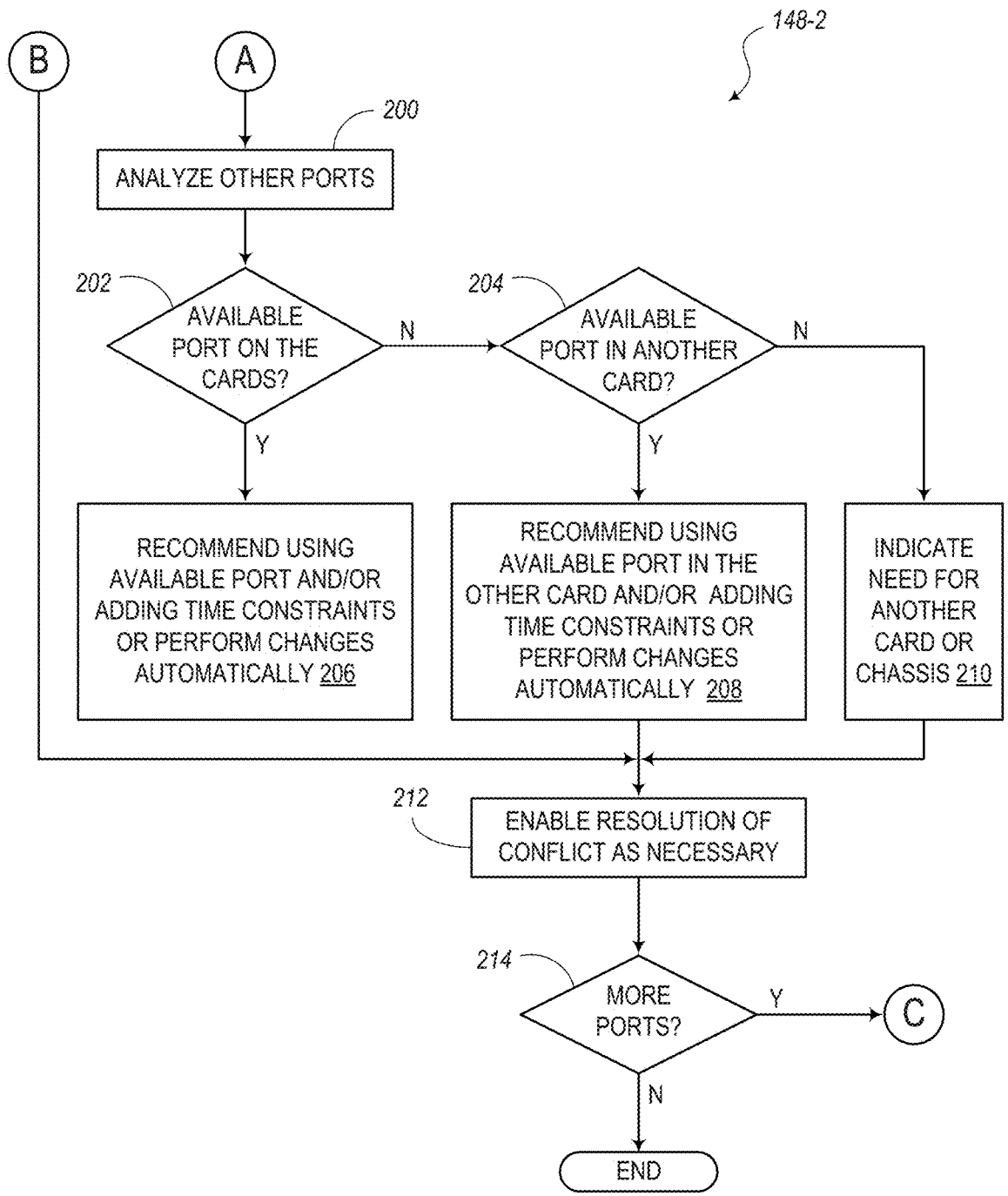

FIGS. 8C and 8D together form the subroutine 148 for analyzing service conflicts after any equipment conflicts have been detected and resolved (when possible), where FIG. 8C shows a first portion 148-1 of the sub-routine 148 and FIG. 8D shows a second portion 148-2 of the sub-routine 148.

As illustrated in this embodiment, the sub-routine 148 includes analyzing a first (or next) port of a network card that is planned for use in a particular slot of a chassis of the network element, as indicated in block 182. Then, the sub-routine 148 includes determining if different services are planned for the same port, as indicated in decision diamond 184. If not, the sub-routine 148 skips down to block 212. However, if it is determined that there are different services planned for the same port, the sub-routine 148 includes determining if the port has bandwidth available to handle the different services, as indicated in decision diamond 186. If there is sufficient bandwidth, then the sub-routine 148 skips down to block 212. If there is not enough bandwidth to handle multiple services on the same port, a conflict is detected and the sub-routine 148 proceeds to decision diamond 188.

In decision diamond 188, it is determined whether or not there are time constraints that have been entered in the proposed plan. If not, the sub-routine 148 jumps to block 196. If there are time constraints, the sub-routine 148 determines whether or not there are any conflicts with overlapping services on the same port, as indicated in decision diamond 190. If there are no time conflicts, the sub-routine 148 skips down to block 212. However, with overlapping time constraints that cause a conflict, the sub-routine 148 is configured to recommend changing the time constraints to resolve the conflict (if possible), as indicated in block 192, which may be an optional step. Also, information may be provided to the planners in order that the planners may attempt to make changes to the proposed plans to resolve any conflicts.

Next, the sub-routine 148 includes determining whether or not the conflicts have been resolved, as indicated in decision diamond 194. If all conflicts have been resolved, the sub-routine 148 skips down to block 212. However, if conflicts still remain at this point, the sub-routine 148 includes communicating textual conflicts to the user, as indicated in block 196. The textual conflicts may be highlighted for the user.

After the step shown in block 196, the sub-routine 148 includes analyzing other ports on the network card, as indicated in block 200 (FIG. 8D). Then, the sub-routine 148 includes the step of determining if there is an available port on the same card that could be used for providing the service(s), as indicated in decision diamond 202. If there is not an available port on the card, the sub-routine 148 goes to decision diamond 204. However, if there an available port on that card, the sub-routine 148 goes to block 206, which includes recommending the modification of the proposed plan to use the available port and/or recommending the modification of the proposed plan to add time constraints to resolve conflicts. In some embodiments, the step of block 206 may include performing any of these changes (e.g., moving services to another port or adding time constraints), which can be done automatically.

Decision diamond 204 includes the step of determining if there are any available ports on another new or existing card for providing services (e.g., a card in another slot of the same chassis or a card in a different chassis). If there are other ports available, the sub-routine 148 includes recommending the use of these available slots in the other and/or adding time constraints to manually resolve the conflict, as indicated in block 208. In some embodiments, the step of block 208 may also (or alternatively) include automatically performing the needed changes to resolve the service port conflict. If it is determined in decision diamond 204 that there are no available ports in other cards, the sub-routine 148 goes to block 210, which includes the step of indicating to the planners a need for another card (or another chassis, if necessary).

After blocks 206, 208, and 210, the sub-routine 148 proceeds to block 212. Also, as mentioned above, the detections in decision blocks 184, 186, 190, and 194 may also lead to block 212. In block 212, the sub-routine 148 includes the step of enabling resolution of service conflicts, as necessary. This may include allowing the planners to manually make changes as the proposed plan (e.g., in response to the recommendations provided in blocks 206 and 208). Then, the sub-routine 148 includes determining whether there are any more ports to be analyzed, as indicated in decision diamond 214. If so, the sub-routine loops back to block 182 (FIG. 8C) to analyze the next port and the process repeats. If there are no more ports at this point, the sub-routine 148 ends and the process 140 of FIG. 8A continues.

Thus, the various embodiments of the systems and methods for managing the collaboration of network planning may use distributed software development and version control concepts to manage network planning augments. The embodiments may define network plans in a suitable format (e.g., JSON) to be understood by the diff/merge functionality of a VCS to manage branching, merging, and conflict detection. Also, the present disclosure provides the collaborative network planning tool 24, which may include domain-aware extensions to VCS diff/merge functionality, domain-specific validation rules similar to software development technique of employing unit tests to ensure the plans remain self-consistent after branches are merged, and true time-aware planning.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a processing device, and
a memory device configured to store a computer program having instructions that, when executed, enable the processing device to
receive a first branch of a provisional plan, the first branch including first information regarding a proposed change to at least one of a network element and one or more services to be provided by the network element;
receive a second branch of the provisional plan, the second branch including second information regarding a proposed change to at least one of the network element and the one or more services to be provided by the network element;
determine if the first branch and the second branch are compatible with each other; and
in response to determining that merging the second branch with the first branch would create a conflict that include one or more of a planned usage of different network cards in a same chassis slot and a planned provisioning of different services from a same port of a network card, provide a resolution to the conflict.

2. The system of claim 1, wherein determining if the first branch and the second branch are compatible with each other includes performing an equipment conflict analysis and a service conflict analysis.

3. The system of claim 2, wherein the equipment conflict analysis includes analyzing a network card planned for use in a slot of a chassis of the network element to determine if a different network card is also planned for use in the same slot at the same time.

4. The system of claim 2, wherein the service conflict analysis includes analyzing one or more ports of one or more network cards to determine if different services are planned to be provisioned from the same one or more ports.

5. The system of claim 1, wherein the instructions further enable the processing device to allow collaboration between a first user and a second user, wherein the first branch is received from a first device associated with the first user and the second branch is received from a second device associated with the second user.

6. The system of claim 5, wherein the instructions further enable the processing device to highlight textual conflicts between the first branch and the second branch in one of a Graphical User Interface (GUI) and Command Line Interface (CLI) in one or more of the first and second devices.

7. The system of claim 1, wherein providing a resolution to the conflict includes recommending one or more modifications to at least one of the first branch and second branch.

8. The system of claim 7, wherein recommending the one or more modifications includes one or more of:
suggesting that a conflicting network card be planned for a different slot available in the network element;
suggesting that time constraints be added or edited to allow different network cards planned for the same slot in the network element to fill the same slot at different times;
suggesting that a service planned on a conflicting port of a network card be moved to a different port available on the network card; and
suggesting that time constraints be added or edited to allow a port planned for providing conflicting services to provide the services at different times.

9. The system of claim 1, wherein the first branch and the second branch include proposed changes at multiple network layers, and wherein providing the resolution includes inter-layer dependencies.

10. The system of claim 1, wherein determining takes place one of before the first branch has been committed and after the first branch has been committed.

11. A non-transitory computer-readable medium configured to store computer logic having instructions that, when executed, cause one or more processing devices to:
receive a first branch of a provisional plan, the first branch including first information regarding a proposed change to at least one of a network element and one or more services to be provided by the network element;
receive a second branch of the provisional plan, the second branch including second information regarding a proposed change to at least one of the network element and the one or more services to be provided by the network element;
determine if the first branch and the second branch are compatible with each other; and
in response to determining that merging the second branch with the first branch would create a conflict that include one or more of a planned usage of different network cards in a same chassis slot and a planned provisioning of different services from a same port of a network card, provide a resolution to the conflict.

12. The non-transitory computer-readable medium of claim 11, wherein determining if the first branch and the second branch are compatible with each other includes performing an equipment conflict analysis and a service conflict analysis, and
wherein the determination takes place one of before the first branch has been committed and after the first branch has been committed.

13. The non-transitory computer-readable medium of claim 12, wherein the equipment conflict analysis includes analyzing a network card planned for use in a slot of a chassis of the network element to determine if a different network card is also planned for use in the same slot at the same time.

14. The non-transitory computer-readable medium of claim 12, wherein the service conflict analysis includes analyzing one or more ports of one or more network cards to determine if different services are planned to be provisioned from the same one or more ports.

15. The non-transitory computer-readable medium of claim 11, wherein the instructions further cause the one or more processing devices to allow collaboration between a first user and a second user, wherein the first branch is received from a first device associated with the first user and the second branch is received from a second device associated with the second user.

16. The non-transitory computer-readable medium of claim 15, wherein the instructions further cause the one or more processing devices to highlight textual conflicts between the first branch and the second branch in one of a Graphical User Interface (GUI) and Command Line Interface (CLI) in one or more of the first and second devices.

17. A method comprising the steps of:
receiving a first branch of a provisional plan, the first branch including first information regarding a change to at least one of a network element and services to be provided by the network element;
receiving a second branch of the provisional plan, the second branch including second information regarding a change to at least one of the network element and the services to be provided by the network element;
determining if the first branch and the second branch are compatible with each other; and
in response to determining that merging the second branch with the first branch would create a conflict that include one or more of a planned usage of different network cards in a same chassis slot and a planned provisioning of different services from a same port of a network card, provide a resolution to the conflict.

18. The method of claim 17, wherein determining if the first branch and the second branch are compatible with each other includes performing an equipment conflict analysis and a service conflict analysis, wherein the equipment conflict analysis includes analyzing a network card planned for use in a slot of a chassis of the network element to determine if a different network card is also planned for use in the same slot at the same time, and wherein the service conflict analysis includes analyzing one or more ports of one or more network cards to determine if different services are planned to be provisioned from the same one or more ports, and
wherein the determining takes place one of before the first branch has been committed and after the first branch has been committed.

19. The method of claim 17, wherein providing a resolution to the conflict includes recommending one or more modifications to at least one of the first branch and second branch, and wherein recommending the one or more modifications includes one or more of:
suggesting that a conflicting network card be planned for a different slot available in the network element;
suggesting that time constraints be added or edited to allow different network cards planned for the same slot in the network element to fill the same slot at different times;
suggesting that a service planned on a conflicting port of a network card be moved to a different port available on the network card; and
suggesting that time constraints be added or edited to allow a port planned for providing conflicting services to provide the services at different times.

20. The method of claim 17, wherein the first branch and the second branch include proposed changes at multiple network layers, and wherein providing the resolution includes inter-layer dependencies.

* * * * *